(12) United States Patent
Gibbs

(10) Patent No.: US 7,438,611 B2
(45) Date of Patent: Oct. 21, 2008

(54) PROPULSION SYSTEM FOR AN AMPHIBIOUS VEHICLE

(75) Inventor: Alan Timothy Gibbs, London (GB)

(73) Assignee: Gibbs Technologies Ltd, Warwickshire (GB)

( * ) Notice: Subject to any disclaimer, the term of this patent is extended or adjusted under 35 U.S.C. 154(b) by 0 days.

(21) Appl. No.: 10/557,295

(22) PCT Filed: May 19, 2004

(86) PCT No.: PCT/GB2004/002143

§ 371 (c)(1),
(2), (4) Date: Nov. 18, 2005

(87) PCT Pub. No.: WO2004/103742

PCT Pub. Date: Dec. 2, 2004

(65) Prior Publication Data

US 2006/0264127 A1    Nov. 23, 2006

(30) Foreign Application Priority Data

May 19, 2003    (GB) .................................. 0311498.0

(51) Int. Cl.
*B60F 3/00*    (2006.01)
*B63H 19/08*   (2006.01)
*B63H 9/08*    (2006.01)

(52) U.S. Cl. .................................. 440/12.5; 440/12.51

(58) Field of Classification Search ............. 440/12.5
See application file for complete search history.

(56) References Cited

U.S. PATENT DOCUMENTS

| | | | |
|---|---|---|---|
| 2,350,037 A | 5/1944 | Hofheins et al. | |
| 3,213,821 A | 10/1965 | Godwin | |
| 3,765,367 A * | 10/1973 | Hendrickson et al. | 440/12.56 |
| 3,903,831 A | 9/1975 | Barlett | |
| 3,968,766 A * | 7/1976 | House | 440/12.67 |
| 4,241,686 A | 12/1980 | Westphalen | |
| 4,387,661 A | 6/1983 | Duff | |
| 4,802,433 A | 2/1989 | Kovac | |
| 5,531,179 A | 7/1996 | Roycroft et al. | |
| 5,690,046 A | 11/1997 | Grzech, Jr. | |

(Continued)

FOREIGN PATENT DOCUMENTS

EP    0970825 A2    1/2000

(Continued)

*Primary Examiner*—Lars A Olson
*Assistant Examiner*—Daniel V Venne
(74) *Attorney, Agent, or Firm*—Fulwider Patton LLP

(57) ABSTRACT

Amphibious vehicle (10), with reference to FIG. 1, which may plane on water, has a propulsion system comprising prime mover (20), power transmission means (30), marine propulsion means (40), and land propulsion means (50). Vehicle (10) is operable in marine mode or land mode. Common controls are used on land and water, the steering control travel may be the same in each mode. Power is transmitted to the marine propulsion means in marine mode; and to both marine and land propulsion means in land mode. The power transmission ratio between land and marine propulsion means may be variable in land mode. The propulsion control means (60) may comprise electronic processing means and/or electrical, mechanical, hydraulic, or electromechanical actuation devices, or any combination thereof. Prime mover (20) may comprise an internal combustion engine; an electric motor, a fuel cell; a hybrid engine; or any combination thereof. The transmission means may be mechanical, electric, or hydraulic.

47 Claims, 4 Drawing Sheets

U.S. PATENT DOCUMENTS

| | | |
|---|---|---|
| 5,727,494 A | 3/1998 | Caserta et al. |
| 5,755,173 A | 5/1998 | Rorabaugh |
| 6,540,569 B1 | 4/2003 | Gong |
| 6,672,916 B1 | 1/2004 | Phillips et al. |

FOREIGN PATENT DOCUMENTS

| | | |
|---|---|---|
| EP | 0970825 A3 | 1/2000 |
| FR | 2647060 A1 | 11/1990 |
| GB | 2391517 | 2/2004 |
| GB | 2401830 A | 11/2004 |
| WO | WO 2002/12005 A1 | 2/2002 |
| WO | WO 2002/14092 A1 | 2/2002 |
| WO | WO 2002/02383 A1 | 3/2002 |
| WO | WO 2002/18161 A1 | 3/2002 |

\* cited by examiner

PROPULSION SYSTEM FOR AN AMPHIBIOUS VEHICLE

RELATED APPLICATIONS

This application is a U.S. national phase of PCT/GB2004/002143, filed May 19, 2004, which claims priority from Great Britain Application Ser. No. 0311498.0, filed May 19, 2003.

The present invention relates to a propulsion system and, in particular, to a propulsion system for an amphibious vehicle.

In the case of dedicated land vehicles and marine vessels known in the art, the apparatus employed for power generation, transmission and control thereof is well developed. However, an amphibious vehicle presents quite unique problems and considerations in this regard. There is a need to employ both marine and land propulsion means, to optimise control and performance of the vehicle both in marine and land modes, and to cater for the transition between marine and land modes and vice-versa. This presents conflicting requirements and dedicated prior art systems are poorly suited to the requirements of an amphibious vehicle, it not being possible to optimise both on-water and on-land performance by simple incorporation of known dedicated systems.

In the past, designers of amphibious vehicles have focussed their efforts on optimising either on-water or on-land performance. As a result of this focus, either on-water performance has been sacrificed in order to give satisfactory on-land performance, or vice-versa. Conversely, the present applicant has preferred to design an amphibious vehicle having optimised on-land and on-water performance. To this end, the applicant has gone against conventional thinking in arriving at the propulsion system according to the present invention.

In particular, the applicant has found it desirable to have a propulsion system which generates and delivers power only to the marine propulsion means when the amphibious vehicle is operated in a marine mode, but which delivers power to both the marine and land propulsion means (equally or in a selectively variable ratio) when operated in a land mode (which mode includes entry into and egress from the water, i.e. both mode changes). This ensures that entry into water is quickly and controllably achieved, as both the marine propulsion (typically, jet thrust) and the land propulsion (typically, rotation of wheels) are available to power the vehicle as soon as it enters water. Furthermore, both marine steering (typically by a jet drive steering nozzle) and road steering (typically by steered front wheels) are available to steer the vehicle both on entry into and egress from the water.

In prior art amphibious vehicles where marine drive has to be deliberately selected after entering water, there can be a delay in achieving availability of marine propulsion and steering, leading to uncertainty of control on entering water. This can lead to difficulties for the vehicle operator in dealing with unexpected or strong water currents, wind effects, underwater obstacles, and/or other marine traffic.

Similarly when moving from water to land, if marine propulsion must be shut down before leaving water, only the land propulsion—typically, rotation of road wheels—is available to drive the vehicle forwards, and there is no marine steering. This severely limits driver control, and also results in slow progress. The availability of marine steering is particularly important when, for example, approaching a slipway on the bank of a fast flowing river or seafront. Marine propellers or jets can be beneficially employed to deliver a vectored thrust in water which can maintain vehicle station relative to a fixed point on the bank of a river, when steered front wheels have little effect.

Planing amphibious vehicles have considerably greater appeal than displacement vehicles, because of their greater speed over water. However, to plane effectively, they must have a rearward weight bias, to ensure that the bow sits up out of the water and the stern sits down in water. If a rearward weight bias is combined with front wheel drive, to ensure that the first wheels to touch a slipway can power the vehicle out of water, the resulting road handling characteristics can be somewhat unexpected, as described in the applicant's co-pending application, published as WO 02/12005. Hence, rear wheel drive is preferred for a planing amphibious vehicle. The designer of such a vehicle must be aware that the first wheels to leave water are not driven, so availability of marine drive is particularly helpful in achieving controlled egress from water.

All of the above considerations are important in designing an amphibious vehicle having optimised on-land and on-water performance. Because such vehicles have never taken a significant share of the overall road vehicle market, it is likely that most owners and operators of such vehicles will never have driven such a vehicle before. Although they may already be skilled in operation of both road vehicles and marine vehicles separately, a vehicle designed to change over between these two modes presents quite novel aspects. Any modification to conventional amphibious vehicle control systems which helps new operators to feel at ease with the vehicle, particularly in the novel experience of driving from land into water and vice versa, is likely to have great value in helping said operators to feel at ease with their new means of transport. A vehicle operator who is calm and collected is more likely to be in safe control of their vehicle than one who is nervously adjusting to a new experience, and is uncertain as to how to proceed. The availability of land and marine vehicle control systems, which as far as possible require similar control inputs and have the same control effect in both land and marine mode, is a vital step in helping the vehicle operator to gain confidence in vehicle control. Furthermore, the "overlap" period when driving from land to water and vice versa, where most controls work in a similar manner to that established during recent operation, will assist the vehicle operator in confidently and safely controlling the vehicle.

It is suggested that the convention in prior art amphibious vehicles of providing full changeover from marine to land mode and vice versa, including decoupling of marine drive, is based on an engineer's understanding of separation of vehicle modes, rather than a consideration of ease of use by a novice operator, and that this has influenced prior art systems (as in U.S. Pat. No. 3,903,831 to Bartlett and U.S. Pat. No. 4,802,433 to Kovac, where it is mechanically necessary to retract the marine propulsion means before leaving water, to avoid grounding of the propeller).

It should also be noted that if, as in the present invention, marine drive is permanently engaged, the cost, weight, bulk, and complexity of a marine decoupler and its associated controls are avoided. These factors are drawbacks to an amphibious vehicle in both road and marine modes. The additional "flywheel effect" of a permanently engaged marine drive may be a drawback under certain conditions when driving on land, but may also be useful in curtailing any tendency to unexpected rapid acceleration on leaving water, when the greater hydrodynamic drag of passage through water is exchanged for the lesser aerodynamic drag of passage through air.

The present invention provides, in a first aspect, a propulsion system for an amphibious vehicle comprising:
 a prime mover;
 marine propulsion means;

land propulsion means; and power transmission means, wherein:

the amphibious vehicle is operable either in a marine mode or in a land mode and when the power transmission means transmits power from the prime mover then the transmitted power is transmitted always to the marine propulsion means whether the vehicle is operated in the marine or land mode; whereby the power transmission means can deliver power from the prime mover only to the marine propulsion means when the vehicle is operated in the marine mode; and the power transmission means can deliver power from the prime mover to both the marine propulsion means and the land propulsion means when the vehicle is operated in the land mode.

Preferably, when the vehicle is operated in the marine mode the marine propulsion means can power the vehicle to a speed where sufficient hydrodynamic lift is achieved for the vehicle to plane.

Preferably, the land mode includes entry of the vehicle into the water and egress of the vehicle from the water.

Preferably, when the amphibious vehicle is operated in the land mode the power transmission means can simultaneously deliver power from the prime mover to both the marine propulsion means and the land propulsion means in equal or selectively variable proportions.

Preferably, the propulsion system comprises decoupling means for selectively decoupling and/or controlling the delivery of power from the prime mover to the land propulsion means.

Preferably, the propulsion system comprises control means for controlling all adjustable parameters of each of the prime mover, marine propulsion means, land propulsion means and power transmission means. More preferably, the control means comprises electronic processing means and/or electrical, mechanical, hydraulic or electromechanical actuation devices, or any combination thereof. Preferably, the control means is at least in part made available to a driver of the vehicle to enable the driver to select or control at least the following: starting and stopping of the prime mover; marine or land mode; steering of the vehicle; gear selection; and speed of the vehicle. It is preferred that the speed of the vehicle both in marine and land modes is controlled by the driver using a single speed controller. Preferably, the direction of the vehicle both in marine and land modes is controlled by the driver using a single steering controller. Furthermore, it is preferred that the vehicle gearbox both in marine and land modes is controlled by the driver using a single gear change/selection controller.

Preferably, the prime mover of the propulsion system comprises any one or a combination of the following: a spark ignition internal combustion engine; a compression ignition internal combustion engine; an electric motor; a fuel cell; or a hybrid engine.

Preferably, the marine propulsion means of the propulsion system comprises one or more jet drives.

Preferably, the land propulsion means of the propulsion system comprises one or more drivable wheels.

Preferably, the power transmission means is integral with the prime mover. Preferably, the power transmission means comprises a marine power transmitting means for transmitting power from the prime mover to the marine propulsion means and a land power transmitting means for transmitting power from the prime mover to the land propulsion means. Preferably, the marine and land power transmission means are of the same type. Alternatively, the marine and land power transmission means are of different types.

Preferably, the marine and/or land power transmission means is mechanical. Preferably, the mechanical power transmission means is a manual or automatic gearbox or continuously variable transmission for providing drive (via drive shafts) to the marine and land propulsion means.

Alternatively, the marine and/or land power transmission means is hydraulic. Preferably, the hydraulic power transmission means includes one or more hydraulic pumps for generating hydraulic power (transmitted via hydraulic lines) and one or more hydraulic motors for providing drive to the marine and/or land propulsion means.

Alternatively, the marine and/or land power transmission means is electric. Preferably, the electric transmission means includes one or more generators, which may be alternators, for generating electric power (transmitted via wires/cabling) and one or more electric motors for providing drive to the marine and/or land propulsion means.

Preferably, the prime mover is located in the middle or the rear of the amphibious vehicle. More preferably, the prime mover is located such that its centre of gravity is positioned between 1.5 m and 1.6 m from the rear of an amphibious vehicle of 4.6 m to 5.0 m in length. Yet more preferably, the centre of gravity is substantially 1.54 m from the rear of an amphibious vehicle of 4.82 m in length.

Preferably the prime mover is arranged transversely in the amphibious vehicle in an East-West or West-East configuration. Alternatively, the prime mover is arranged in line in the amphibious vehicle in a North-South or South-North configuration.

Preferably, the prime mover has an integral power take-off shaft which is used to provide power directly to the marine propulsion means. Preferably, the prime mover has an integral gearing arrangement such that the power take-off shaft rotates at a speed different to that of the prime mover.

Preferred embodiments of the present invention will now be described by way of example only with reference to the accompanying drawings, in which.

Figure 1:
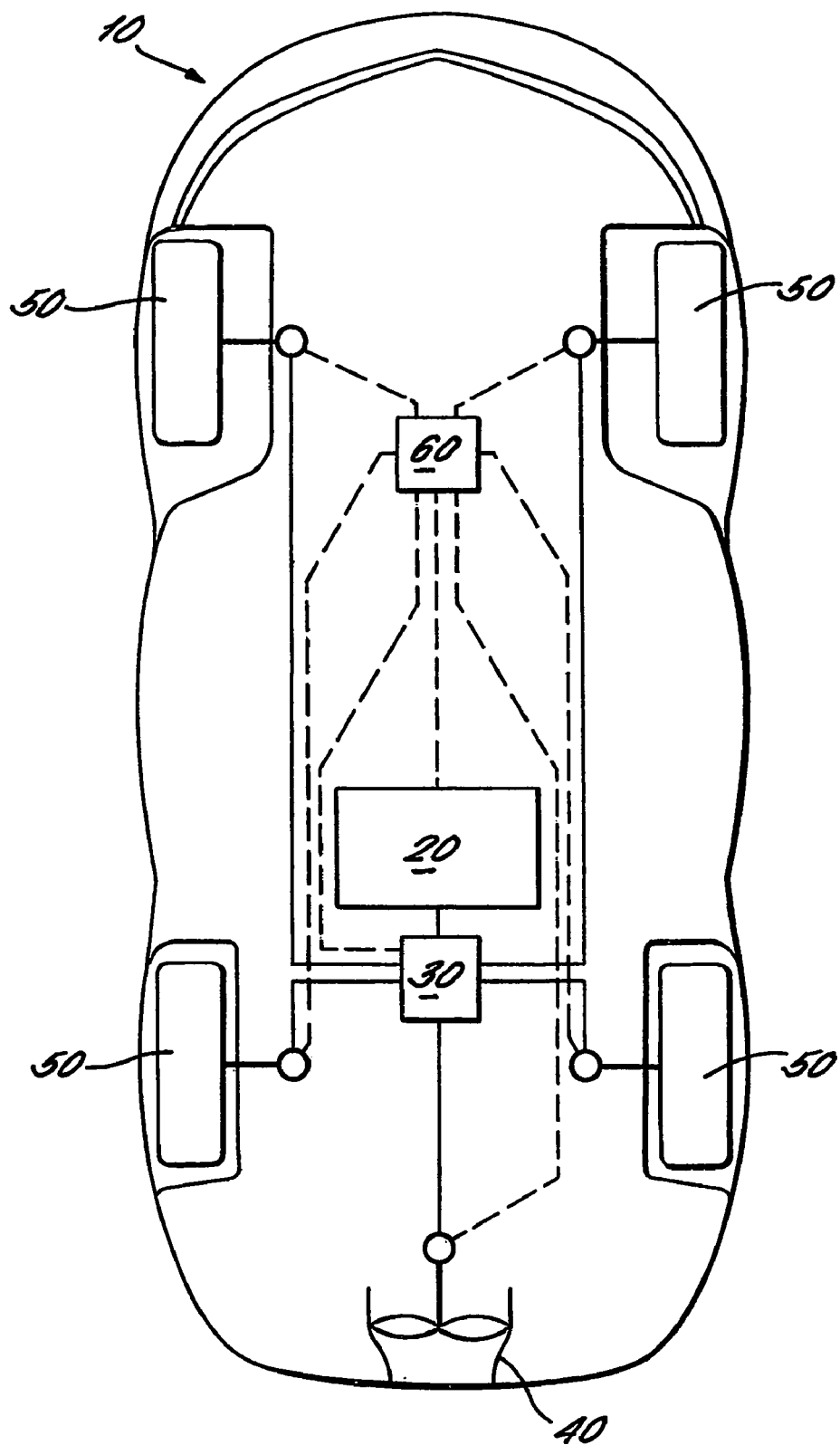
FIG. 1 is a schematic overview illustrating a propulsion system according to the present invention installed in an amphibious vehicle.

Referring first to FIG. 1, there is illustrated a schematic overview of a propulsion system according to the present invention installed in an amphibious vehicle 10. A prime mover 20 provides power for propelling the amphibious vehicle 10 when operating both in the marine and land modes. Power generated by the prime mover 20 is distributed via a power transmission means 30 to a marine propulsion means 40 and/or a land propulsion means 50. The delivery of power to the respective marine propulsion means 40 and land propulsion means 50 via the power transmission means 30 is controlled by a control means 60. The control means 60 acts at least in part on i) inputs from a driver of the vehicle 10; and ii) inputs from vehicle sensors (not shown), under the control of an electronic control module (ECM) (not shown) using control logic well known in the art (e.g. stored on EPROM, ROM and/or RAM).

An essential feature of the present invention is that when operating in the marine mode, the propulsion system generates and controls the delivery of power only to the marine propulsion means 40 in accordance with control inputs from the driver, and that while operating in the land mode, the propulsion system generates and controls delivery of power to both the marine propulsion means 40 and the land propulsion means 50 in accordance with control inputs from the driver. In the present invention, the amphibious vehicle 10 can operate in only one of two modes. The first is a marine mode where the vehicle 10 can be driven only on water either in a fully displaced mode or in a high speed planing mode where sufficient hydrodynamic lift is achieved by through-water speed that the vehicle 10 rises up out of the water and onto the plane. The second is a land mode in which the vehicle 10 adopts one of three phases. The first phase of the land mode is simply driving the vehicle 10 in normal land conditions, as in the case of a car. The second phase is entry of the vehicle 10 into the water from the land, and the third phase egress of the vehicle 10 from the water onto the land. In all three phases of the land mode, the propulsion system delivers power to both the marine propulsion means 40 and the land propulsion means 50 under the command of control means 60 acting on inputs from the driver.

It can be seen that the propulsion system according to the present invention is shown schematically and may take the form of many different embodiments. For example, it will be appreciated that the land propulsion means 50 may be effected by way of two wheel drive, either front wheel drive or rear wheel drive, or four wheel drive.

Figure 2:
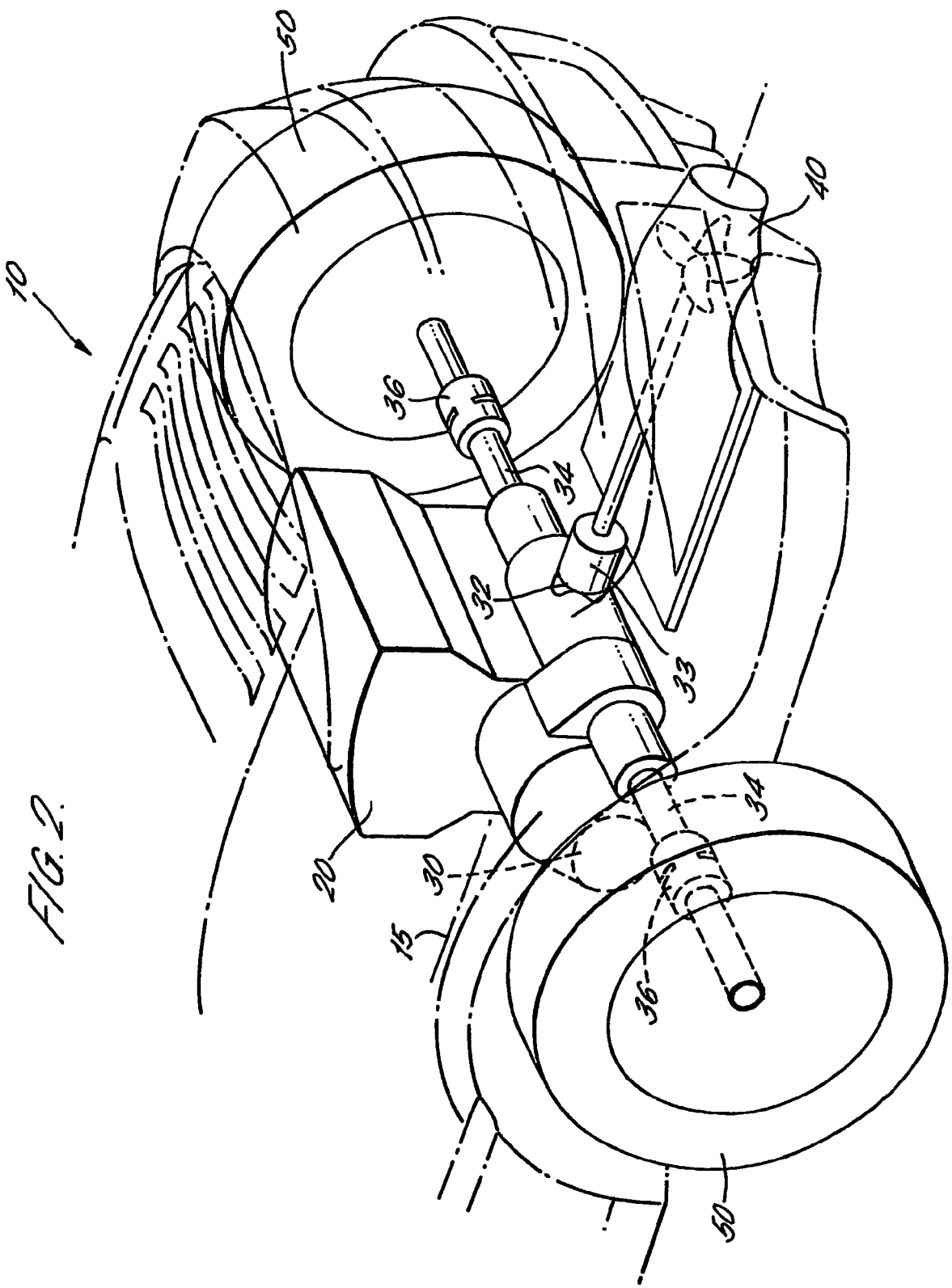
FIG. 2 illustrates a first preferred embodiment of propulsion system according to the present invention.

Referring next to FIG. 2, there is illustrated a preferred embodiment of propulsion system according to the present invention which is installed in an amphibious vehicle 10 adopting the layout of two wheel drive (rear wheel drive) and having a mid-mounted engine (a rear mounted engine could also be used). In this context, a mid-mounted engine is conventionally mounted aft of the passenger seating area, but in front of the rear axle. However, there is an exception to this rule, in that the French Hobbycar amphibious vehicle had an engine mounted in the centre of the vehicle, and individual passenger compartments at the four corners of the vehicle. The Hobbycar must be considered mid-engined, as the engine is at the centre of the vehicle; but the layout had various practical drawbacks, and the Hobbycar was not a commercial success.

Returning to FIG. 2, the prime mover takes the form of an internal combustion engine 20 transversely mounted in the middle or rear of the amphibious vehicle 10. The power transmission means takes the form of an automatic gear box 30 and can transfer drive from the internal combustion engine 20 at a range of gear ratios to driveshafts 34 and a power take off (PTO) shaft 32. Driveshafts 34 each deliver drive from the automatic gear box 30 to the land propulsion means, in the form of two rear wheels 50 mounted on and driven by driveshafts 34. Each driveshaft 34 includes a decoupler 36 in order to control the delivery of drive to each of the rear wheels 50. Although two decouplers 36 are shown, a decoupler may be fitted to one driveshaft only, relying on the vehicle handbrake to lock the other driveshaft. Each decoupler 36 is preferably actuated by hydraulic means (not shown), and built into a constant velocity (CV) joint. A synchromesh mechanism may also be incorporated, as described in the applicant's co-pending application, published as WO 02/14092. Drive from the gear box 30 is transferred to the marine propulsion means 40, via the power take off shaft 32 and coupling 33. In this preferred embodiment, the marine propulsion means 40 takes the form of a jet drive as disclosed in the applicant's co-pending patent UK patent application no. 0311495.6 entitled 'A Jet Drive For An Amphibious Vehicle'.

Figure 3:
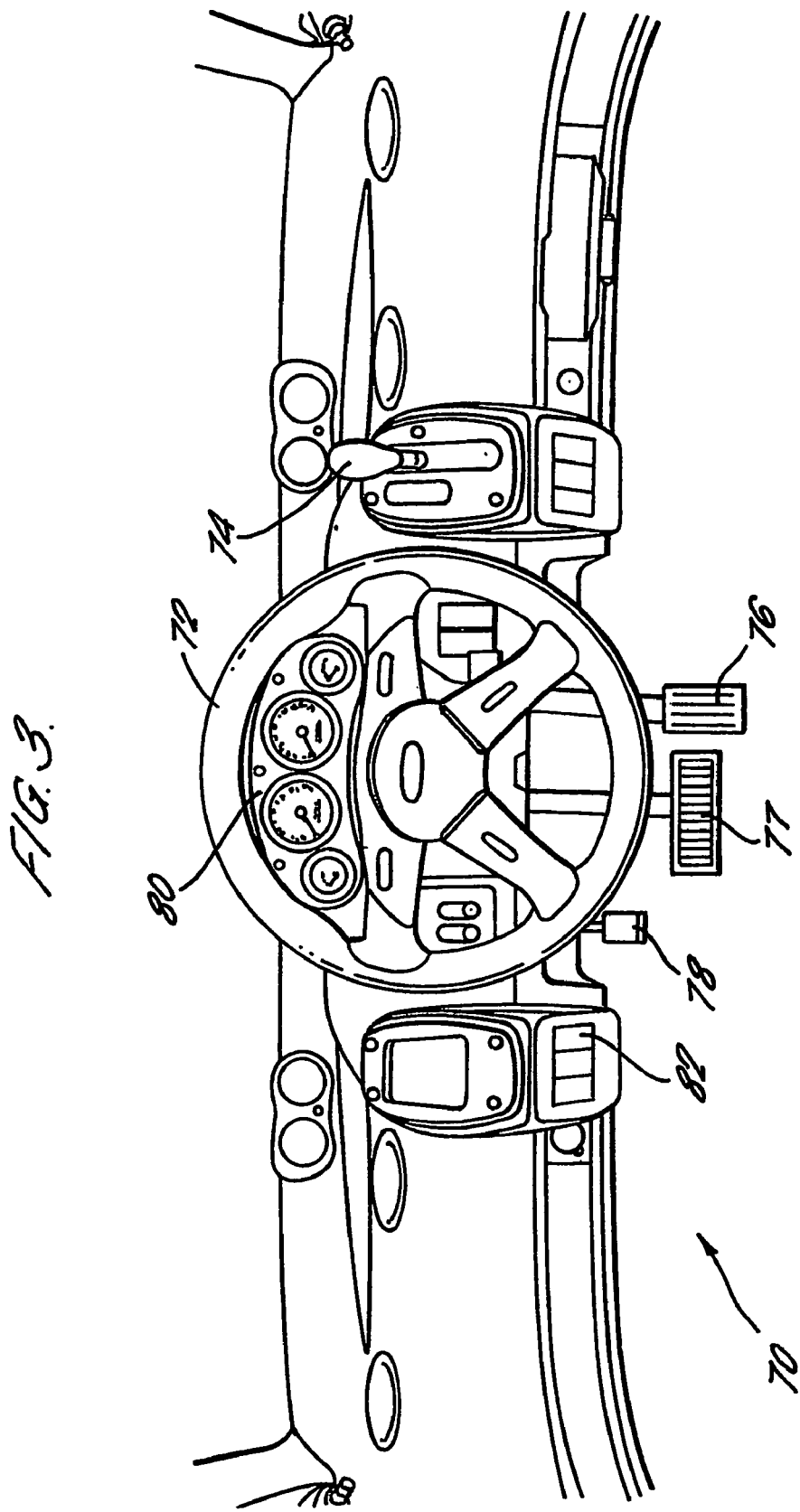
FIG. 3 illustrates a preferred embodiment of driver interface for controlling the propulsion system of FIGS. 1 and 2.

As mentioned above, an electronic control module (ECM) (not shown) forms part of the control means 60 used to effect control of the propulsion system, and does so in part upon receiving inputs from the driver of the vehicle 10 via the driver interface 70 illustrated in FIG. 3. The driver interface 70 can be seen to take the form of a typical vehicle dashboard layout. The driver can be seen to have a central driving position with passenger/crew seats (not shown) located either side of the driver's seat. The seating arrangement and adjustment mechanism employed is disclosed in the applicants co-pending patent application no. GB0218604.7. The control means 60 may also include an ignition switch and an immobiliser system, and engine and gearbox/transmission management computers, as is known in the automotive engineering art. These additional items may be physically separate to, or integrated with, the ECM and/or the control means 60.

Figure 4:
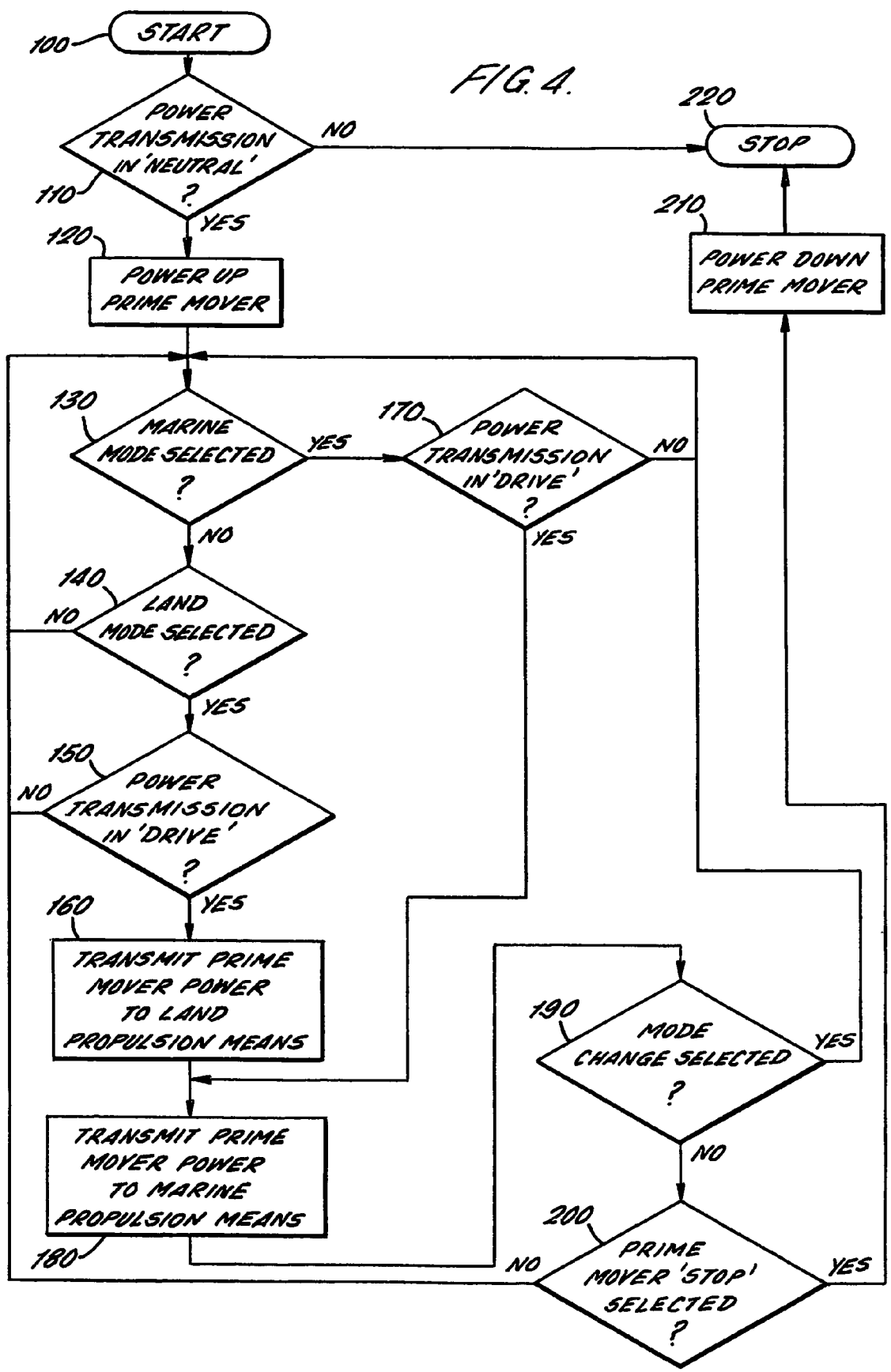
FIG. 4 is a flow chart schematically illustrating a preferred control process of the propulsion system of FIG. 2.

With reference also to FIG. 4, which depicts a flow chart illustrating the functionality of the control means 60 incorporating the ECM, a first preferred mode of operation of the amphibious vehicle 10 will now be described. The driver first activates the control means 60 of the amphibious vehicle 10 by inserting a key and turning on the ignition in a conventional manner, step 100. The engine starter interlock will only permit starting of the engine 20 provided that the gear selector or automatic transmission selector 74 is in the "neutral" or "park" position, step 110. If so, then the engine 20 starts, step 120, otherwise the engine 20 will not start, step 220.

The driver can control the power generated by the engine 20 using an accelerator pedal 76 as is known in the art. Accelerator pedal 76 controls both the power generated by the engine 20 and the delivery of that power to the jet drive 40 and/or wheels 50 when power is being transmitted in either the marine or the land mode. Whilst in the preferred embodiment illustrated the transmission is an automatic gear box with associated gear selector 74, it will be appreciated that a manual transmission may be provided and include a clutch pedal for engaging drive as is known in the art.

A steering wheel 72 is provides for controlling the steering of the vehicle 10, again both when in the marine and land modes. Steering of the vehicle 10 is effected in both marine and land modes by the steering wheel 72 as is described in the applicant's co-pending patent application no. GB0309452.1.

The dashboard layout includes a series of dials 80 for informing the driver of the speed of the vehicle 10 (measured in mph or km/h when on land or on water), together with rpm or power output from the engine, and respective temperature and fuel gauges as is known in the art. A foot brake pedal 77 is provided for actuation of wheel brakes; and a parking brake pedal 78 is provided for actuating a parking brake when the vehicle 10 is parked in land mode.

Next, at step 130 (mode identification/selection), the control means 60 determines if marine mode has been selected via mode selector button 82. If marine mode has been or is selected, then as part of the land to marine mode change, drive to the road wheels 50 is decoupled. Hence, when gear selector 74 is moved to a "drive" position, step 170, power from the engine 20 is transmitted to the jet drive 40 only, step 180. If the marine mode has not been selected, then the control means 60 determines at step 140 if land mode has been selected via mode selector button 82. If land mode has been or is selected, then as part of the marine to land mode change, drive to the road wheels 50 is coupled. Hence, when gear selector 74 is moved to a "drive" position, step 150, the engine 20 provides power to the wheels 50 via the gearbox 30 and driveshafts 34 (the de-couplers 36 being coupled) and also transmits power from the engine 20 to the jet drive 40 via the power take off shaft 32. In either mode, control of the vehicle 10 is then effected by the driver using the steering wheel 72, accelerator pedal 76, foot brake pedal 77, and gear selector 74. Next, the control means 60 proceeds to step 190 and if a mode change is detected, the system returns to the mode identification/selection routine at 130 and the control process continues. Alternatively, if no mode change is selected by the driver via the mode selector button 82, then the control means 60 proceeds to step 200 to determine whether or not the driver has selected to stop the engine 20. If not, then the control means returns to the start of the mode identification/selection routine at step 130 and continues as described above. However, if the driver selects to stop the engine 20, then the control means 60 moves to step 210 at which point the engine 20 is shut down with the vehicle control process terminating at step 220.

In an analogous process to the above, when the vehicle is converted from marine mode to land mode, the wheel decouplers 36 are coupled, so that drive to the marine drive only in marine mode is converted to drive to marine drive and to the wheels in land mode.

It will be appreciated that whilst in the preferred embodiment described above the prime mover 20 takes the form of an internal combustion engine, the prime mover 20 could alternatively take the form of a compression ignition internal combustion engine, an electric motor, a fuel cell, a hybrid engine or any combination thereof. Furthermore, whilst the power transmission means 30 takes the form of a conventional automatic gearbox delivering power via shafts and axles (including a power take off shaft), it will be appreciated that a number of alternative layouts could be implemented. For example, the power transmission means 30 could include or take the form of a continuously variable transmission for providing drive to the marine and land propulsion means. In particular, it is envisaged that if the prime mover is an electric motor or generates electricity via an alternator, that one or more electric motors could be provided to drive one or more wheels and/or the jet drive. Alternatively, the prime mover 20 could power a hydraulic pump or pumps such as a swash plate pump, and power could be distributed to the wheels and/or jet drive by means of hydraulic piping and pressurised hydraulic fluid which drives a hydraulic motor or motors coupled directly to each wheel 50 and/or jet drive 40.

Furthermore, it will be appreciated that different mechanical, electrical and/or hydraulic hybrid system combinations could be beneficially employed. For example, the prime mover 20 could take the form of an internal combustion engine which provides drive mechanically to a jet drive 40 via a gearbox and shaft combination, and which provides drive hydraulically to one or more wheels 50 via a swash plate pump, hydraulic lines and a hydraulic motor on the one or more of the wheels 50.

Whilst it is preferred that the marine propulsion means is embodied in the form of a jet drive 40, it will be appreciated that a traditional propeller and propeller shaft could alternatively be employed. Similarly, whilst it has been described that the land propulsion means comprises road wheels 50, tracks could alternatively be employed.

In all cases, the particular prime mover, marine propulsion means, land propulsion means and power transmission means, together with their associated layout, is adopted as best suits the particular application of amphibious vehicle, as will be readily understood by the skilled person in the art.

Furthermore, the prime mover may be mounted transversely as shown in the figures and as described in the applicant's co-pending application published as WO 02/07999; or longitudinally, as is found convenient. An example of a power train comprising a longitudinally mounted prime mover may be found in the applicant's co-pending application published as WO 02/12005. The propulsion system described above may be particularly suitable to an amphibious vehicle incorporating road wheels which may be retracted above the water line for use on water, and protracted below the water line for use on land.

The invention claimed is:

1. A propulsion system for an amphibious vehicle comprising:
    a prime mover;
    marine propulsion means;
    land propulsion means;
    power transmission means, further comprising a marine power transmitting means for transmitting power from the prime mover to the marine propulsion means and a land power transmitting means for transmitting power from the prime mover to the land propulsion means, wherein the marine power transmitting means and land power transmitting means are of different types; and
    control means for controlling adjustable parameters of each of the prime mover, marine propulsion means, land propulsion means, and power transmission means and amphibious vehicle, wherein the amphibious vehicle is operable either in a marine mode or in a land mode, wherein the power transmission means delivers power from the prime mover only to the marine propulsion means when the vehicle is operated in the marine mode, wherein the power transmission means delivers power from the prime mover to both the marine propulsion means and the land propulsion means when the vehicle is operated in the land mode, and wherein the control means includes electronic processing means, electrical, mechanical, hydraulic or electromechanical actuation devices and is at least in part made available to a driver of the vehicle to enable the driver to select or control the adjustable parameters both in marine and land modes using a single actuation device for each parameter or each set of parameters.

2. A propulsion system as claimed in claim 1 wherein the control means enables the driver to select or control the following individual parameters;
    starting and stopping of the prime mover;
    marine or land mode;
    steering of the vehicle; and
    speed of the vehicle.

3. A propulsion system as claimed in claim 1 wherein the speed of the vehicle both in marine and land modes is controlled by the driver using a single speed controller.

4. A propulsion system as claimed claim 1 wherein the direction of the vehicle both in marine and land modes is controlled by the driver using a single steering controller.

5. A propulsion system as claimed in claim 4 wherein the single steering controller has a range of travel and the range of travel is the same both in marine and land modes.

6. A propulsion system as claimed in claim 5 wherein the range of travel of the single steering controller gives the driver access to the full range of vehicle steering available in marine and land modes.

7. A propulsion system as claimed in claim 6 wherein the ratio of the range of travel of the single steering controller to the range of vehicle steering available in marine and/or land modes is 1:1.

8. A propulsion system as claimed in claim 6 wherein the ratio of the range of travel of the single steering controller to the range of vehicle steering available in marine and/or land modes is other than 1:1.

9. A propulsion system as claimed in claim 1 wherein the power transmission means comprises a gearbox and the gearbox both in marine and land modes is controlled by the driver using a single gearchange controller.

10. A propulsion system as claimed in claim 1 wherein when the vehicle is operated in the marine mode the marine propulsion means can power the vehicle to a speed where sufficient hydrodynamic lift is achieved for the vehicle to plane.

11. A propulsion system as claimed in claim 1 wherein the land mode includes entry of the vehicle into the water and egress of the vehicle from the water.

12. A propulsion system as claimed in claim 1 wherein when the amphibious vehicle is operated in the land mode the power transmission means can simultaneously deliver power from the prime mover to both the marine propulsion means and the land propulsion means in equal or selectively variable proportions.

13. A propulsion system as claimed in claim 1 further comprising decoupling means for selectively decoupling and/or controlling the delivery of power from the prime mover to the land propulsion means.

14. A propulsion system as claimed in claim 1 wherein the marine propulsion means comprises one or more jet drives.

15. A propulsion system as claimed in claim 1 wherein the land propulsion means comprises one or more driveable wheels.

16. A propulsion system as claimed in claim 1 wherein one of said power transmitting means is mechanical.

17. A propulsion system as claimed in claim 1 wherein one of said power transmitting means is hydraulic.

18. A propulsion system as claimed in claim 17 wherein the hydraulic power transmitting means includes one or more hydraulic pumps for generating hydraulic power.

19. A propulsion system as claimed in claim 1 wherein one of said power transmitting means is electric.

20. A propulsion system for an amphibious vehicle comprising:
    a prime mover;
    marine propulsion means;
    land propulsion means;
    power transmission means, wherein the prime mover has an integral power take-off shaft which is used to provide power directly to the marine propulsion means; and
    control means for controlling adjustable parameters of each of the prime mover, marine propulsion means, land propulsion means, and power transmission means and amphibious vehicle, wherein the amphibious vehicle is operable either in a marine mode or in a land mode, wherein the power transmission means delivers power from the prime mover only to the marine propulsion means when the vehicle is operated in the marine mode, wherein the power transmission means delivers power from the prime mover to both the marine propulsion means and the land propulsion means when the vehicle is operated in the land mode, and wherein the control means includes electronic processing means, electrical, mechanical, hydraulic or electromechanical actuation devices and is at least in part made available to a driver of the vehicle to enable the driver to select or control the adjustable parameters both in marine and land modes using a single actuation device for each parameter or each set of parameters.

21. A propulsion system as claimed in claim 20 wherein the control means enables the driver to select or control the following individual parameters;
    starting and stopping of the prime mover;
    marine or land mode;
    steering of the vehicle; and
    speed of the vehicle.

22. A propulsion system as claimed in claim 20 wherein the speed of the vehicle both in marine and land modes is controlled by the driver using a single speed controller.

23. A propulsion system as claimed claim 20 wherein the direction of the vehicle both in marine and land modes is controlled by the driver using a single steering controller.

24. A propulsion system as claimed in claim 23 wherein the single steering controller has a range of travel and the range of travel is the same both in marine and land modes.

25. A propulsion system as claimed in claim 24 wherein the range of travel of the single steering controller gives the driver access to the full range of vehicle steering available in marine and land modes.

26. A propulsion system as claimed in claim 25 wherein the ratio of the range of travel of the single steering controller to the range of vehicle steering available in marine and/or land modes is 1:1.

27. A propulsion system as claimed in claim 25 wherein the ratio of the range of travel of the single steering controller to the range of vehicle steering available in marine and/or land modes is other than 1:1.

28. A propulsion system as claimed in claim 20 wherein the power transmission means further comprises a gearbox and the gearbox both in marine and land modes is controlled by the driver using a single gearchange controller.

29. A propulsion system as claimed in claim 20 wherein when the vehicle is operated in the marine mode the marine propulsion means can power the vehicle to a speed where sufficient hydrodynamic lift is achieved for the vehicle to plane.

30. A propulsion system as claimed in claim 20 wherein the land mode includes entry of the vehicle into the water and egress of the vehicle from the water.

31. A propulsion system as claimed in claim 20 wherein when the amphibious vehicle is operated in the land mode the power transmission means can simultaneously deliver power from the prime mover to both the marine propulsion means and the land propulsion means in equal or selectively variable proportions.

32. A propulsion system as claimed in claim 20 further comprising decoupling means for selectively decoupling and/or controlling the delivery of power from the prime mover to the land propulsion means.

33. A propulsion system as claimed in claim 20 wherein the marine propulsion means comprises one or more jet drives.

34. A propulsion system as claimed in claim 20 wherein the land propulsion means comprises one or more driveable wheels.

35. A propulsion system as claimed in claim 20 wherein the power transmission means comprises a marine power transmitting means for transmitting power from the prime mover to the marine propulsion means and a land power transmitting means for transmitting power from the prime mover to the land propulsion means.

36. A propulsion system as claimed in claim 35 wherein the marine and land power transmitting means are of the same type.

37. A propulsion system as claimed in claim 35 wherein the land power transmission means is mechanical.

38. A propulsion system as claimed in claim 35 wherein the land power transmitting means is hydraulic.

39. A propulsion system as claimed in claim 38 wherein the hydraulic power transmitting means includes one or more hydraulic pumps for generating hydraulic power.

40. A propulsion system as claimed in claim 35 wherein the land power transmitting means is electric.

41. An amphibious vehicle incorporating a propulsion system, comprising:
- a prime mover;
- marine propulsion means;
- land propulsion means;
- power transmission means; and
- control means for controlling adjustable parameters of each of the prime mover, marine propulsion means, land propulsion means, and power transmission means and amphibious vehicle, wherein the amphibious vehicle is operable either in a marine mode or in a land mode, wherein the power transmission means delivers power from the prime mover only to the marine propulsion means when the vehicle is operated in the marine mode, wherein the power transmission means delivers power from the prime mover to both the marine propulsion means and the land propulsion means when the vehicle is operated in the land mode, and wherein the control means includes electronic processing means, electrical, mechanical, hydraulic or electromechanical actuation devices and is at least in part made available to a driver of the vehicle to enable the driver to select or control the adjustable parameters both in marine and land modes using a single actuation device for each parameter or each set of parameters; and
- one or more wheels which may be retracted above the water line for use on water, and protracted below the water line for use on land.

42. An amphibious vehicle as claimed in claim 41 wherein at least one of the one or more wheels is retracted by a fluid suspension arrangement.

43. An amphibious vehicle as claimed in claim 42 wherein the axis of at least one of the one or more wheels is retracted by at least 45 degrees.

44. An amphibious vehicle as claimed in claim 42 wherein the fluid suspension arrangement is hydraulic.

45. An amphibious vehicle as claimed in claim 42 wherein the fluid suspension arrangement is gaseous.

46. An amphibious vehicle as claimed claim 42 wherein the suspension arrangement includes at least one strut.

47. An amphibious vehicle as claimed in claim 46 wherein the at least one strut is also used for suspension in land mode.

* * * * *